(12) United States Patent
Shen

(10) Patent No.: US 6,414,675 B1
(45) Date of Patent: Jul. 2, 2002

(54) PERSONAL COMPUTER SYSTEM HAVING WAKE-UP FUNCTIONALITY CONTROLLED BY A CD CONTROL PANEL

(75) Inventor: Chun-Te Shen, Taipei (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 191 days.

(21) Appl. No.: 09/597,749

(22) Filed: Jun. 19, 2000

(51) Int. Cl.[7] .................................................. G09G 5/00
(52) U.S. Cl. ........................ 345/211; 713/321; 713/324; 710/14
(58) Field of Search ................................ 345/156, 211, 345/212; 713/321, 322, 323, 324, 320; 710/14, 266, 310; 361/681, 682, 683; 348/173

(56) References Cited

U.S. PATENT DOCUMENTS 5,978,923 A  * 11/1999 Kou ............................ 713/323
6,006,285 A  * 12/1999 Jacobs et al. ................. 710/14
6,073,187 A  *  6/2000 Jacobs et al. ................. 710/14
6,116,767 A  *  9/2000 Chaiken et al. ............... 710/14

* cited by examiner

Primary Examiner—Dennis-Doon Chow
(74) Attorney, Agent, or Firm—Winston Hsu

(57) ABSTRACT

A personal computer (PC) system has, amongst other circuitry and devices, a CD drive, a CD playing control circuit, an embedded controller, a CD control panel and an embedded display program contained within the Basic Input Output System (BIOS) of the memory of the computer. With the CD drive, the CD playing control circuit and the CD control panel, a user can listen to a CD when the computing and display portions of the PC system are turned off. However, upon a predetermined button pressing of the CD control panel, the embedded controller will turn on both the processor and the display of the PC system, and cause the processor to begin executing the embedded display program.

14 Claims, 3 Drawing Sheets

PERSONAL COMPUTER SYSTEM HAVING WAKE-UP FUNCTIONALITY CONTROLLED BY A CD CONTROL PANEL

BACKGROUND OF THE INVENTION

1. Field of the Invention

The present invention relates to a personal computer (PC) system with an autonomous CD circuit. More specifically, a PC system having a program that is activated and controlled using a CD control panel of the CD circuit is disclosed.

2. Description of the Prior Art

Recently, laptop computer systems with autonomous CD players have come onto the market. The "Toshiba PC" notebook computer from Toshiba is such an example. These computers enable a user to listen to a CD, using the built-in CD drive of the computer, when the other circuitry of the computer, i.e., the processor, memory and display circuitry, is turned off. In this mode, the PC system functions somewhat like a large portable stereo system.

Please refer to FIGS. 1 and 2. FIG. 1 depicts a prior art laptop PC system 10 with an autonomous CD player, as described above. FIG. 2 is a functional block diagram of the PC system 10. Of relevance to this invention, the prior art PC system 10 comprises a display 12, two speakers 14, a headphone jack 16, a CD drive 18, and a CD control panel 20. Inside the casing of the PC system 10 are also a processor 13, a memory 15, a CD playing control circuit 17, and a power supply 11, as well as a great deal of other complex circuitry.

The power supply 11 provides electrical power to all of the components of the laptop PC system 10, and during portable operations is usually a battery, or a plurality of batteries. The CD playing control circuit 17 is electrically connected to both the CD control panel 20 and the CD drive 18. The CD drive 18, in turn, is electrically connected to both the headphone jack 16 and the speakers 14. When electrical power is turned off to all other components of the PC system 10, the power supply 11 may still deliver power to the CD drive 18 and the CD playing control circuit 17. The CD playing control circuit 17 controls the operations of the CD drive 18 and can itself be controlled by a user via the CD control panel 20. Even though the computing and display portions of the laptop PC system 10 are turned off, the user can still listen to a CD. As in a portable stereo device, play, track forward, track review and stop buttons on the CD control panel 20 permit a user to listen to a CD in the CD drive 18, using either the speakers 14 or headphones 22 plugged into the headphone jack 16.

The above design was invented because many users were using their laptop computers as highly complex personal stereo systems. Consequently, it became clear that a great deal of battery life was being wasted on processor and display systems that weren't being utilized. The user simply didn't need the processor 13 and the relatively power-hungry display 12 to exclusively listen to a CD. The dedicated CD playing control circuit 17, and the associated CD control panel 20 would suffice for dedicated playing needs. This prior art design greatly extended battery operational time, and hence the number of CDs to which a user could listen.

Unfortunately, this prior art design has a simple drawback: if a user does wish to use a program on the laptop PC system 10, the computing-related portions of the laptop PC system must be turned on. In doing so, the user must wait through a lengthy booting procedure. This booting procedure is also wasteful of battery power. This can be frustrating, as a user frequently may wish to perform a relatively simple task, such as setting a timer or an alarm clock.

SUMMARY OF THE INVENTION

It is therefore a primary objective of this invention to provide an embedded controller in a PC system that, upon a predetermined control signal from a CD control panel, will cause the processor and display to turn on, and cause the processor to run an embedded display program.

The present invention, briefly summarized, discloses a personal computer (PC) system with a CD drive, a CD playing control circuit, an embedded controller, a CD control panel and an embedded display program contained within the Basic Input Output System (BIOS) of the memory of the computer. With the CD drive, the CD playing control circuit and the CD control panel, a user can listen to a CD when the computing and display portions of the PC system are turned off. However, upon a predetermined control signal from the CD control panel, the embedded controller will turn on both the processor and the display of the PC system, and cause the processor to begin executing the embedded display program.

It is an advantage of the present invention that no lengthy booting procedure is required to begin executing the embedded display program. Consequently, a user suffers no inconvenience to run the program. Moreover, by avoiding the computer booting process, power is conserved, which extends the operational time of the battery.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
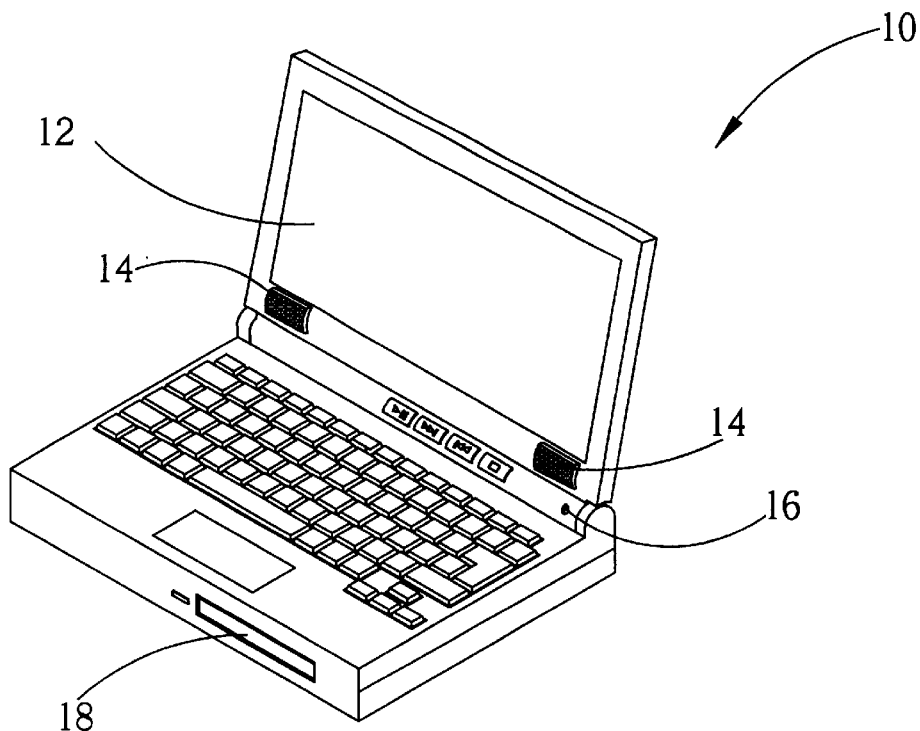
FIG. 1 is a perspective view of a prior art PC system with an autonomous CD drive.
Figure 3:
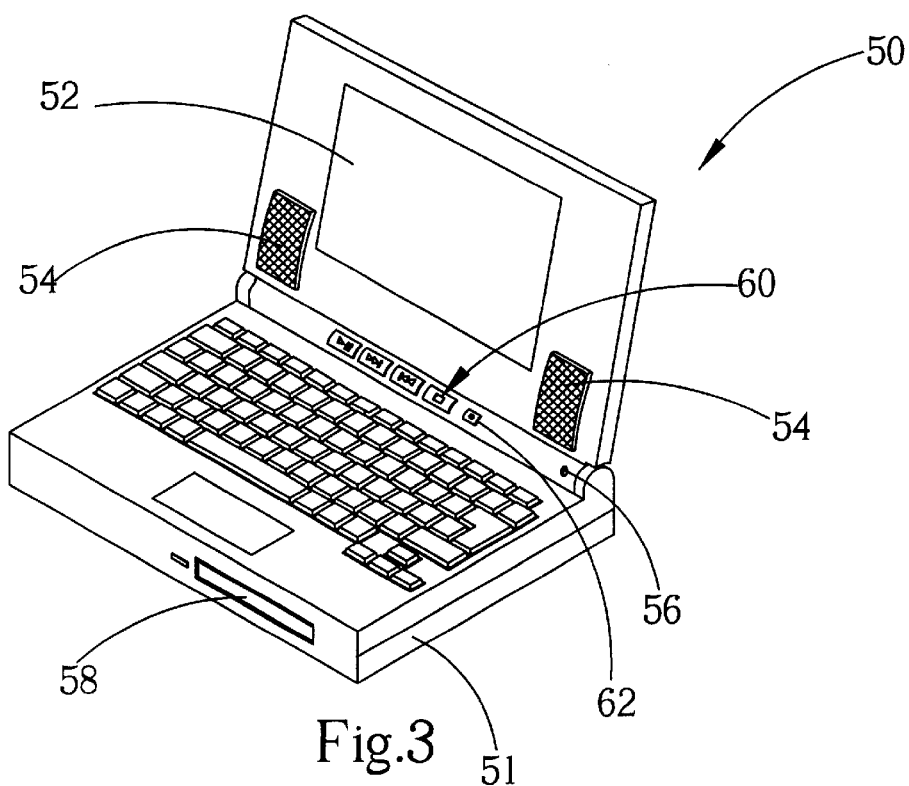
FIG. 3 is a perspective view of a PC system according to the present invention.
Figure 2:
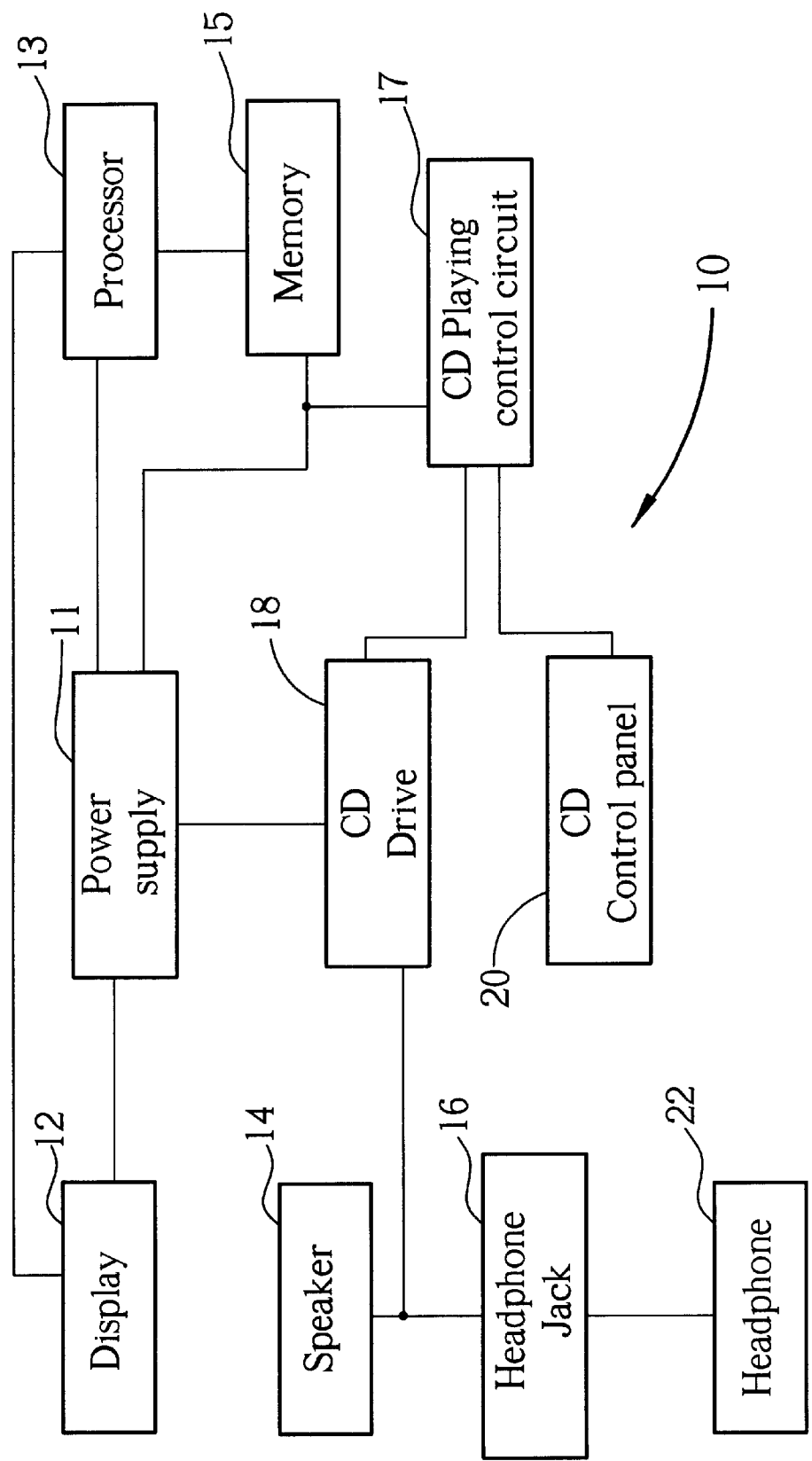
FIG. 2 is a functional block diagram of the PC system in FIG. 1.
Figure 4:
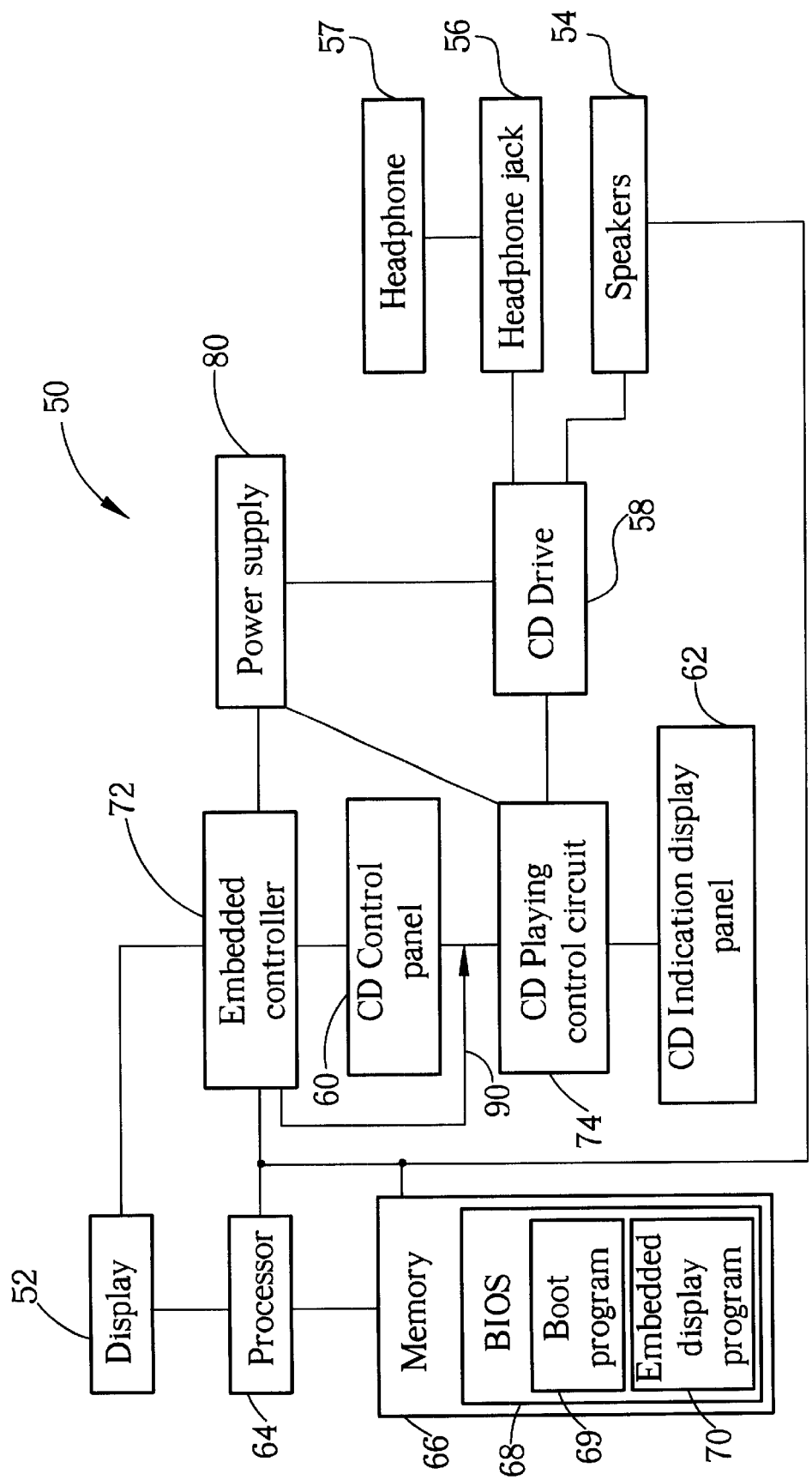
FIG. 4 is a functional block diagram of the PC system in FIG. 3.

Please refer to FIG. 3 and FIG. 4. FIG. 3 is a perspective view of a PC system 50 according to the present invention. FIG. 4 is a functional block diagram of the PC system 50. The PC system 50 comprises a housing 51, a display 52, a CD drive 58, a CD control panel 60, and a CD indication display panel 62. To permit a user to listen to a CD within the CD drive 58, the PC system 50 should also have a headphone jack, or at least one speaker. The preferred embodiment PC system 50 has a headphone jack 56, as well as two speakers 54, which permit stereophonic reproduction.

Within the housing 51, the PC system 50 further comprises a processor 64, a memory 66 electrically connected to the processor 64, an embedded controller 72 electrically connected to the processor 64, a CD playing control circuit 74 electrically connected to the CD drive 58, and a power supply 80. The memory 66 comprises a Basic Input Output System (BIOS) 68 that performs basic system function routines for the PC system 50. The BIOS 68 contains a boot program 69 for booting an operating system of the PC system 50, and an embedded display program 70, which is the program of relevance to this invention. The power supply 80 supplies electrical power to all of the components of the PC system 50. In the preferred embodiment, the PC system 50 is a laptop computer, and hence the power supply 80 should comprise at least one battery that provides electrical power during portable operations. The CD control panel 60 sends control signals to both the embedded controller 72 and the CD playing control circuit 74. The CD control panel 60 should have at least one button. In the preferred embodiment, the CD control panel 60 comprises play/pause, next track, previous track, and stop buttons. The CD indication display panel 62 is used to indicate a current state of the CD playing control circuit 74, to which it is electrically connected. For example, the CD indication display panel 62 could be an LCD display showing the current track of the CD that is being played in the CD drive 58, the playing time, the playing time remaining, etc. In the preferred embodiment of the PC system 50, though, the CD indication display panel 62 is simply an LED that glows when a CD is being played in the CD drive 58. The CD playing control circuit 74 is available on the market, and its functionality is well known. The present invention, for example, utilizes a chip from Oz Micro, their OZ163 chip.

During computational operations, the processor 64 executes a program in the memory 66, and controls the display 52 to present visual information to a user. The processor 64, display 52 and memory 66 all obtain electrical power from the power supply 80 via the embedded controller 72. The embedded controller 72, therefore, can act as a switch, selectively turning on or off the computational and display elements of the PC system 50. On the other hand, the CD playing control circuit 74, the embedded controller 72 and the CD drive 58 all directly obtain their power from the power supply 80, and so can operate even when the processor 64 and display 52 are turned off.

As described in the prior art, because power is always available to the CD drive 58, and to the CD playing control circuit 74, a user can listen to a CD in the CD drive 58 even when no power is provided to the processor 64 or the display 52. By placing a CD in the CD drive 58 and using the CD control panel 60, a user can listen to the CD either through the speakers 54 or headphones 57 plugged into the headphone jack 56. The CD playing control circuit 74 controls the operations of the CD drive 58 according to the control signals it receives from the CD control panel 60. The CD drive 58, in turn, controls the headphone jack 56, and the speakers 54.

The CD control panel 60 also sends control signal information to the embedded controller 72. When the embedded controller 72 detects a predetermined control signal, for example a simultaneous pressing of both the stop and play buttons, the embedded controller 72 will turn on the processor 64, the memory 66 and the display 52. When turned on, the processor 64 would normally begin executing boot program 69 in the BIOS 68. The embedded controller 72, however, sends an interrupt signal to the processor 64. This interrupt causes the processor 64 to execute different code within the BIOS 68, and this code causes the embedded display program 70 to execute.

The embedded display program 70 may be any program which a manufacturer deems beneficial to the user. For example, the preferred embodiment embedded display program 70 of the present invention comprises timer and alarm clock programs. These programs will be used for illustrative purposes in the following.

Upon receiving the predetermined control signal, the embedded controller 72 turns on the memory 66, processor 64 and display 52. The embedded controller 72 then interrupts the processor 64 to force the execution of the embedded display program 70. The embedded display program 70 controls the display 52 to provide visual information to the user. For example, it may display the current time, an alarm time or a countdown time. The embedded controller 72 can comprise a variety of support circuitry that may be required to provide the functionality of the embedded display program 70. Consequently, the embedded display program 70 can obtain information from the embedded controller 72, and set information within the embedded controller 72.

For example, the embedded controller 72 may contain a timer and a memory to hold the alarm times and the countdown times. The embedded display program 70 obtains this information stored within the embedded controller 72 and displays it to the user on the display 52. Using the embedded controller 72, the embedded display program 70 can obtain control signal information from the CD control panel 60 and use this information to enable a user to manipulate the information shown on the display 52. For example, the user may use one of the buttons to select a field to manipulate, i.e., a day, hour, minute or second field, and then use the other buttons to increment or decrement a value contained within this field. When finished, the embedded display program 70 can store this new information in the embedded controller 72. The embedded controller 72 may then turn off the memory 66, processor 64 and display 52.

When an appropriate amount of time has elapsed, i.e., an alarm time has been reached, or a countdown time exceeded, the circuitry within the embedded controller 72 can determine this condition, turn on the memory 66, processor 64 and display 52, and force the execution of the embedded display program 70. The embedded display program 70, obtaining the relevant information from the embedded controller 72, can then cause the speakers 54 to emit an audible alarm. The user may manipulate the CD control panel 60 to turn off the alarm and cause the embedded controller 72 to once again shut down the display 52, processor 64 and memory 66.

When the embedded display program 70 is running, the user may use the CD control panel 60 to enter and manipulate information shown on the display 52. However, these control signals will also be sent to the CD playing control circuit 74, causing it to behave in an undesirable manner for the user. Consequently, it is probably beneficial to prevent the control signals from being sent to the CD playing control circuit 74 when the embedded display program 70 is running. This functionality is indicated by the arrow 90, which is a buffer that prevents control signals from reaching the CD playing control circuit 74 when the embedded display program 70 is running. The buffer 90 is controlled by the embedded controller 72.

Many minor alterations can be made to the PC system 50, while achieving the same basic functionality. For example, the embedded controller 72 may only turn on the memory 66 and the processor 64. The processor 64, in turn, may cause the display 52 to turn on. Similarly, the CD playing control circuit 74 and CD drive 58 may be switched, i.e., they may be manually turned off by a user using a switch on the housing 51. The embedded controller 72 may not need to use an interrupt to activate the embedded display program 70. Instead, the BIOS 68, after performing some initial booting steps, may itself determine from the embedded controller 72 that the embedded display program 70 should be run, and consequently transfer execution to the embedded display program 70. It is also fully possible that a keyboard, or even a pointing device (not shown), of the PC system 50 could be used to enter and manipulate information when the embedded display program 70 is running. The preferred embodiment envisions the PC system 50 as a laptop computer, since running the embedded display program 70 without requiring a booting process offers significant power-saving characteristics, and thus extends battery operational times. However, the present invention PC system 50 could just as easily be a desktop PC, as many users might find it convenient to avoid the tedium of an operating system boot. Finally, it should be rioted that when headphones 57 are plugged into the headphone jack 56, the speakers 54 should be silenced.

In contrast to the prior art, the present invention utilizes an embedded controller and an embedded display program within the BIOS of the PC system to run programs without needing to boot the computer. Upon receiving a predetermined control signal from the CD control panel, the embedded controller causes the processor, memory and display to turn on, and then causes the processor to execute the embedded display program. This saves both time and electrical power, as no lengthy operating system booting process is required. When the embedded display program has finished running, the embedded controller may then turn off the memory, processor and display.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A personal computer (PC) system comprising:

a housing;

a power supply for providing electrical power to the PC system;

a processor installed within the housing for processing programs and data;

a memory electrically connected to the processor, the memory comprising a Basic Input Output System (BIOS), the BIOS having an embedded display program and a boot program, the boot program being used to boot an operating system of the PC system;

a display electrically connected to the processor for displaying images, the processor being able to effect the contents of the display;

a CD drive installed in the housing for reading data from a CD;

a CD playing control circuit electrically connected to the CD drive and being used to control operations of the CD drive;

an embedded controller electrically connected to the processor and to the CD playing control circuit, the embedded controller controlling operations of the processor; and a CD control panel electrically connected to the CD playing control circuit and to the embedded controller; wherein a user can use the CD control panel to control the CD playing control circuit to play the CD in the CD drive when the processor and the display are turned off;

wherein when the user inputs a predetermined control signal from the CD control panel, the embedded controller will cause the processor and the display to be turned on, cause the processor to execute the embedded display program without executing the boot program, and the embedded display program can receive and respond to different control signals from the CD control panel to display information on the display.

2. The PC system of claim 1 wherein when the processor has finished executing the embedded display program, the embedded controller will cause the processor and the display to turn off.

3. The PC system of claim 1 wherein the embedded controller contains information that the embedded display program uses to control the contents of the display.

4. The PC system of claim 3 wherein the embedded display program can change the information in the embedded controller.

5. The PC system of claim 1 wherein after turning on the processor, the embedded controller causes an interrupt to be sent to the processor, the interrupt causing the processor to execute the BIOS, and the BIOS causes the processor to execute the embedded display program.

6. The PC system of claim 1 wherein when the processor is executing the embedded display program, the embedded controller prevents the CD control panel from controlling the operations of the CD playing control circuit.

7. The PC system of claim 1 further comprising a speaker electrically connected to the CD drive and to the processor; wherein the user can use the CD control panel, the CD drive, and the speaker to listen to the CD.

8. The PC system of claim 7 wherein the embedded display program is an alarm clock program, the user using the CD control panel to control the alarm clock program, and when the embedded controller determines that a time specified by the user has been reached, the embedded controller will turn on the processor to cause the processor to execute the alarm clock program.

9. The PC system of claim 8 wherein when the time specified by the user has been reached, the alarm clock program will cause the speaker to emit an audible alarm.

10. The PC system of claim 7 wherein the embedded display program is a timer program, the user using the CD control panel to control the timer program, and when the embedded controller determines that a period of time specified by the user has elapsed, the embedded controller will turn on the processor to cause the processor to execute the timer program.

11. The PC system of claim 10 wherein when the period of time specified by the user has elapsed, the timer program will cause the speaker to emit an audible alarm.

12. The PC system of claim 1 further comprising a CD indication display panel installed on the housing and electrically connected to the CD playing control circuit for indicating a state of the CD playing control circuit.

13. The PC system of claim 1 wherein the PC system is a notebook computer.

14. The PC system of claim 1 wherein the power supply has at least one battery.

* * * * *

UNITED STATES PATENT AND TRADEMARK OFFICE
CERTIFICATE OF CORRECTION

PATENT NO. : 6,414,675 B1 Page 1 of 1
APPLICATION NO. : 09/597749
DATED : July 2, 2002
INVENTOR(S) : Chen-Te Shen It is certified that error appears in the above-identified patent and that said Letters Patent is hereby corrected as shown below:

On the title page (73), change the assignee information to read: --Compal Electronics Inc., Neihu Taipai, Taiwan (TW)--.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

PATENT NO.        : 6,414,675 B1                                       Page 1 of 1
APPLICATION NO. : 09/597749
DATED             : July 2, 2002
INVENTOR(S)       : Chun-Te Shen It is certified that error appears in the above-identified patent and that said Letters Patent is hereby corrected as shown below:

On the title page (73), change the assignee information to read: --Compal Electronics Inc., Neihu Taipai, Taiwan (TW)--.

This certificate supersedes the Certificate of Correction issued February 6, 2007.

Signed and Sealed this

First Day of September, 2009

David J. Kappos
*Director of the United States Patent and Trademark Office*